United States Patent
Jiang et al.

(10) Patent No.: US 11,113,667 B1
(45) Date of Patent: Sep. 7, 2021

(54) SYSTEMS AND METHODS FOR PROVIDING A DASHBOARD FOR A COLLABORATION WORK MANAGEMENT PLATFORM

(71) Applicant: Asana, Inc., San Francisco, CA (US)

(72) Inventors: Lili Jiang, San Francisco, CA (US); Eric Seth Pelz, San Francisco, CA (US); Adam Butler, San Francisco, CA (US); Johanna Pajak, Oakland, CA (US)

(73) Assignee: Asana, Inc., San Francisco, CA (US)

( * ) Notice: Subject to any disclaimer, the term of this patent is extended or adjusted under 35 U.S.C. 154(b) by 284 days.

(21) Appl. No.: 16/224,321

(22) Filed: Dec. 18, 2018

(51) Int. Cl.
*G06Q 10/10* (2012.01)
*G06Q 10/06* (2012.01)
*H04L 12/18* (2006.01)
*H04L 29/08* (2006.01)
*G06F 21/62* (2013.01)

(52) U.S. Cl.
CPC .......... *G06Q 10/103* (2013.01); *G06F 21/62* (2013.01); *G06Q 10/0633* (2013.01); *G06Q 10/06316* (2013.01); *G06Q 10/06398* (2013.01); *G06Q 10/10* (2013.01); *H04L 12/1822* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 5,233,687 A | 8/1993 | Henderson, Jr. | |
| 5,524,077 A | 6/1996 | Faaland | |
| 5,623,404 A | 4/1997 | Collins | |
| 5,721,770 A | 2/1998 | Kohler | |
| 5,983,277 A * | 11/1999 | Heile | G01R 31/3177 709/232 |
| 6,024,093 A | 2/2000 | Cron | |
| 6,256,651 B1 | 7/2001 | Tuli | |
| 6,621,505 B1 | 9/2003 | Beauchamp | |
| 6,769,013 B2 * | 7/2004 | Frees | G06Q 10/10 707/999.01 |
| 6,859,523 B1 | 2/2005 | Jilk | |
| 7,039,596 B1 | 5/2006 | Lu | |

(Continued)

OTHER PUBLICATIONS

Command and control, wikipedia, archives org, Mar. 16, 2018 https://web.archive.org/web/20180316193655/https://en.wikipedia.org/wiki/Command_and_control (Year: 2018), 6 pages.

(Continued)

*Primary Examiner* — Lashonda T Jacobs (74) *Attorney, Agent, or Firm* — Esplin & Associates, PC (57) ABSTRACT

Systems, methods, and storage media for providing a dashboard for a collaboration work management platform are disclosed. Exemplary implementations may: manage environment state information for maintaining a collaboration environment; obtain a first set of units of work where a first user is associated with first units of work within the first set but not assigned to the first units of work; and/or effectuate presentation of a dashboard displaying work information for the first units of work within the first set and indicating titles for the first units of work within the first set, statuses of the first units of work within the first set, and user information for the one or more other users assigned to the first units of work within the first set.

20 Claims, 6 Drawing Sheets

(56) References Cited

U.S. PATENT DOCUMENTS

| | | | |
|---|---|---|---|
| 7,086,062 B1 | 8/2006 | Faour | |
| 7,349,920 B1 | 3/2008 | Feinberg | |
| 7,418,482 B1 | 8/2008 | Lusher | |
| 7,428,723 B2 | 9/2008 | Greene | |
| 7,676,542 B2 * | 3/2010 | Moser | G06Q 10/107 709/204 |
| 7,805,327 B1 | 9/2010 | Schulz | |
| 7,917,855 B1 | 3/2011 | Satish | |
| 7,996,744 B2 * | 8/2011 | Ojala | H04L 1/1887 714/748 |
| 7,996,774 B1 * | 8/2011 | Sidenur | G06Q 10/10 715/743 |
| 8,214,747 B1 | 7/2012 | Yankovich | |
| 8,314,809 B1 | 11/2012 | Grabowski | |
| 8,499,300 B2 | 7/2013 | Zimberg | |
| 8,522,240 B1 | 8/2013 | Merwarth | |
| 8,527,287 B1 | 9/2013 | Bhatia | |
| 8,554,832 B1 | 10/2013 | Moskovitz | |
| 8,572,477 B1 | 10/2013 | Moskovitz | |
| 8,627,199 B1 | 1/2014 | Handley | |
| 8,639,552 B1 | 1/2014 | Chen | |
| 8,831,879 B2 | 9/2014 | Stamm | |
| 8,843,832 B2 * | 9/2014 | Frields | G06F 9/542 715/756 |
| 8,863,021 B1 | 10/2014 | Bee | |
| 9,009,096 B2 | 4/2015 | Pinckney | |
| 9,024,752 B2 | 5/2015 | Tumayan | |
| 9,143,839 B2 | 9/2015 | Reisman | |
| 9,152,668 B1 | 10/2015 | Moskovitz | |
| 9,208,262 B2 * | 12/2015 | Bechtel | G06F 16/904 |
| 9,350,560 B2 * | 5/2016 | Hupfer | G06Q 10/10 |
| 9,383,917 B2 | 7/2016 | Mouton | |
| 9,405,532 B1 | 8/2016 | Sullivan | |
| 9,405,810 B2 | 8/2016 | Smith | |
| 9,454,623 B1 * | 9/2016 | Kaptsan | G06F 30/13 |
| 9,514,424 B2 | 12/2016 | Kleinbart | |
| 9,600,136 B1 | 3/2017 | Yang | |
| 9,785,445 B2 | 10/2017 | Mitsui | |
| 9,842,312 B1 | 12/2017 | Rosati | |
| 9,949,681 B2 | 4/2018 | Badenes | |
| 9,959,420 B2 * | 5/2018 | Kiang | G06F 21/552 |
| 9,978,040 B2 * | 5/2018 | Lee | G06Q 10/101 |
| 1,000,369 A1 | 6/2018 | Wolthuis | |
| 9,990,636 B1 | 6/2018 | Lewis | |
| 1,008,341 A1 | 9/2018 | Suntinger | |
| 1,015,735 A1 | 12/2018 | Johnson | |
| 1,019,218 A1 | 1/2019 | Katkar | |
| 1,023,515 A1 | 3/2019 | Johnson | |
| 10,264,067 B2 * | 4/2019 | Subramani | H04L 67/1046 |
| 10,308,992 B2 * | 6/2019 | Chauvin | C21D 11/00 |
| 10,373,090 B2 * | 8/2019 | Holm | G06Q 10/0633 |
| 10,382,501 B2 * | 8/2019 | Malatesha | H04L 65/1089 |
| 1,049,694 A1 | 12/2019 | De Niladri | |
| 1,060,685 A1 | 3/2020 | Smith | |
| 1,061,373 A1 | 4/2020 | Ummon | |
| 1,068,487 A1 | 6/2020 | Sabo | |
| 10,671,692 B2 | 6/2020 | Koopman | |
| 10,684,870 B1 * | 6/2020 | Sabo | G06F 9/451 |
| 10,706,484 B1 | 7/2020 | Murnock | |
| 10,785,046 B1 | 9/2020 | Raghavan | |
| 1,081,022 A1 | 10/2020 | Koch | |
| 1,084,629 A1 | 11/2020 | Smith | |
| 2002/0065798 A1 * | 5/2002 | Bostleman | G06Q 10/10 |
| 2002/0082889 A1 | 6/2002 | Oliver | |
| 2002/0143594 A1 | 10/2002 | Kroeger | |
| 2003/0028595 A1 * | 2/2003 | Vogt | H04L 67/42 709/204 |
| 2003/0036934 A1 | 2/2003 | Ouchi | |
| 2003/0097410 A1 * | 5/2003 | Atkins | H04L 29/12594 709/206 |
| 2003/0126001 A1 | 7/2003 | Northcutt | |
| 2003/0225598 A1 | 12/2003 | Yu | |
| 2003/0233265 A1 | 12/2003 | Lee | |
| 2003/0233268 A1 | 12/2003 | Taqbeem | |
| 2004/0083448 A1 | 4/2004 | Schulz | |
| 2004/0093290 A1 | 5/2004 | Doss | |
| 2004/0093351 A1 | 5/2004 | Lee | |
| 2004/0098291 A1 | 5/2004 | Newburn | |
| 2004/0125150 A1 | 7/2004 | Adcock | |
| 2004/0187089 A1 | 9/2004 | Schulz | |
| 2004/0207249 A1 * | 10/2004 | Baumgartner | F16D 65/123 301/105.1 |
| 2004/0230447 A1 * | 11/2004 | Schwerin-Wenzel | G06Q 10/10 705/300 |
| 2005/0216111 A1 | 9/2005 | Ooshima | |
| 2005/0222971 A1 | 10/2005 | Cary | |
| 2006/0028917 A1 | 2/2006 | Wigginton | |
| 2006/0047454 A1 | 3/2006 | Tamaki | |
| 2006/0085245 A1 | 4/2006 | Takatsuka | |
| 2006/0167736 A1 | 7/2006 | Weiss | |
| 2006/0190391 A1 | 8/2006 | Cullen, III | |
| 2006/0200264 A1 | 9/2006 | Kodama | |
| 2006/0218551 A1 | 9/2006 | Berstis | |
| 2006/0224430 A1 | 10/2006 | Butt | |
| 2006/0277487 A1 | 12/2006 | Poulsen | |
| 2007/0016646 A1 | 1/2007 | Tendjoukian | |
| 2007/0025567 A1 | 2/2007 | Fehr | |
| 2007/0038494 A1 * | 2/2007 | Kreitzberg | G06Q 10/10 358/1.9 |
| 2007/0041542 A1 | 2/2007 | Schramm | |
| 2007/0050225 A1 | 3/2007 | Leslie | |
| 2007/0073575 A1 | 3/2007 | Yomogida | |
| 2007/0147178 A1 | 6/2007 | Masuda | |
| 2007/0150327 A1 | 6/2007 | Dromgold | |
| 2007/0232278 A1 | 10/2007 | May | |
| 2007/0255674 A1 * | 11/2007 | Mahoney | G06F 16/907 |
| 2007/0255715 A1 * | 11/2007 | Li | G06Q 10/00 |
| 2007/0260499 A1 | 11/2007 | Greef | |
| 2007/0288283 A1 | 12/2007 | Fitzpatrick | |
| 2007/0294344 A1 | 12/2007 | Mohan | |
| 2008/0033777 A1 | 2/2008 | Shukoor | |
| 2008/0046471 A1 | 2/2008 | Moore | |
| 2008/0079730 A1 | 4/2008 | Zhang | |
| 2008/0082389 A1 | 4/2008 | Gura | |
| 2008/0082956 A1 | 4/2008 | Gura | |
| 2008/0120129 A1 | 5/2008 | Seubert | |
| 2008/0126930 A1 | 5/2008 | Scott | |
| 2008/0134069 A1 | 6/2008 | Horvitz | |
| 2008/0158023 A1 * | 7/2008 | Chung | G06F 3/018 341/28 |
| 2008/0167937 A1 | 7/2008 | Coughlin | |
| 2008/0175104 A1 | 7/2008 | Grieb | |
| 2008/0195964 A1 | 8/2008 | Randell | |
| 2008/0221946 A1 | 9/2008 | Balon | |
| 2008/0268876 A1 | 10/2008 | Gelfand | |
| 2008/0270198 A1 | 10/2008 | Graves | |
| 2008/0281665 A1 | 11/2008 | Opaluch | |
| 2008/0313004 A1 | 12/2008 | Ryan | |
| 2009/0048986 A1 | 2/2009 | Anderson | |
| 2009/0076878 A1 | 3/2009 | Woerner | |
| 2009/0089133 A1 | 4/2009 | Johnson | |
| 2009/0094623 A1 | 4/2009 | Chakra | |
| 2009/0133027 A1 | 5/2009 | Gunning | |
| 2009/0167553 A1 | 7/2009 | Hong | |
| 2009/0187454 A1 | 7/2009 | Khasin | |
| 2009/0199192 A1 | 8/2009 | Laithwaite | |
| 2009/0204463 A1 | 8/2009 | Burnett | |
| 2009/0204471 A1 | 8/2009 | Elenbaas | |
| 2009/0234699 A1 | 9/2009 | Steinglass | |
| 2009/0241053 A1 | 9/2009 | Augustine | |
| 2009/0260010 A1 | 10/2009 | Burkhart | |
| 2009/0299803 A1 | 12/2009 | Lakritz | |
| 2010/0005087 A1 | 1/2010 | Basco | |
| 2010/0070888 A1 | 3/2010 | Watabe | |
| 2010/0088137 A1 | 4/2010 | Weiss | |
| 2010/0106627 A1 | 4/2010 | O'Sullivan | |
| 2010/0114786 A1 | 5/2010 | Aboujaoude | |
| 2010/0115523 A1 | 5/2010 | Kuschel | |
| 2010/0131860 A1 * | 5/2010 | DeHaan | G06Q 10/10 715/751 |
| 2010/0145801 A1 | 6/2010 | Chekuri | |
| 2010/0169146 A1 | 7/2010 | Hoyne | |

(56) References Cited

U.S. PATENT DOCUMENTS

| | | | |
|---|---|---|---|
| 2010/0169802 A1 | 7/2010 | Goldstein | |
| 2010/0180212 A1 | 7/2010 | Gingras | |
| 2010/0223575 A1 | 9/2010 | Leukart | |
| 2010/0269049 A1 | 10/2010 | Fearon | |
| 2010/0299171 A1 | 11/2010 | Lau | |
| 2010/0312605 A1 | 12/2010 | Mitchell | |
| 2010/0313151 A1 | 12/2010 | Wei | |
| 2011/0015961 A1 | 1/2011 | Chan | |
| 2011/0055177 A1 | 3/2011 | Chakra | |
| 2011/0071878 A1 | 3/2011 | Gingras | |
| 2011/0071893 A1 | 3/2011 | Malhotra | |
| 2011/0072372 A1 | 3/2011 | Fritzley | |
| 2011/0093538 A1 | 4/2011 | Weir | |
| 2011/0093619 A1 | 4/2011 | Nelson | |
| 2011/0113365 A1 | 5/2011 | Kimmerly | |
| 2011/0154216 A1 | 6/2011 | Aritsuka | |
| 2011/0161128 A1 | 6/2011 | Barney | |
| 2011/0184768 A1 | 7/2011 | Norton | |
| 2011/0270644 A1 | 11/2011 | Roncolato | |
| 2011/0307772 A1 | 12/2011 | Lloyd | |
| 2012/0030194 A1 | 2/2012 | Jain | |
| 2012/0035942 A1 | 2/2012 | Graupner | |
| 2012/0066030 A1* | 3/2012 | Limpert | G06Q 10/0639 705/7.38 |
| 2012/0066411 A1 | 3/2012 | Jeide | |
| 2012/0072251 A1 | 3/2012 | Mircean | |
| 2012/0079449 A1 | 3/2012 | Sanderson | |
| 2012/0110087 A1 | 5/2012 | Culver | |
| 2012/0117499 A1 | 5/2012 | Mori | |
| 2012/0131191 A1 | 5/2012 | May | |
| 2012/0158946 A1 | 6/2012 | Shafiee | |
| 2012/0192086 A1* | 7/2012 | Ghods | H04L 12/1859 715/753 |
| 2012/0221963 A1 | 8/2012 | Motoyama | |
| 2012/0239451 A1 | 9/2012 | Caligor | |
| 2012/0254218 A1 | 10/2012 | Ali | |
| 2012/0266068 A1 | 10/2012 | Ryman | |
| 2012/0278388 A1 | 11/2012 | Kleinbart | |
| 2012/0296993 A1 | 11/2012 | Heyman | |
| 2013/0013560 A1* | 1/2013 | Goldberg | G06Q 10/101 707/634 |
| 2013/0014023 A1 | 1/2013 | Lee | |
| 2013/0018688 A1 | 1/2013 | Nudd | |
| 2013/0021629 A1 | 1/2013 | Kurilin | |
| 2013/0067375 A1 | 3/2013 | Kim | |
| 2013/0067549 A1 | 3/2013 | Caldwell | |
| 2013/0073328 A1 | 3/2013 | Ehrler | |
| 2013/0103412 A1 | 4/2013 | Nudd | |
| 2013/0124638 A1* | 5/2013 | Barreto | G06F 15/16 709/205 |
| 2013/0151421 A1 | 6/2013 | Van Der Ploeg | |
| 2013/0151604 A1* | 6/2013 | Ranade | A63F 13/00 709/204 |
| 2013/0173486 A1 | 7/2013 | Peters | |
| 2013/0179208 A1 | 7/2013 | Chung | |
| 2013/0179799 A1 | 7/2013 | Savage | |
| 2013/0215116 A1 | 8/2013 | Siddique | |
| 2013/0227007 A1* | 8/2013 | Savage | G06Q 10/101 709/204 |
| 2013/0246110 A1 | 9/2013 | Nakhayi Ashtiani | |
| 2013/0246399 A1* | 9/2013 | Schneider | G06Q 10/06 707/722 |
| 2013/0279685 A1 | 10/2013 | Kohler | |
| 2013/0317871 A1 | 11/2013 | Kulkarni | |
| 2013/0339831 A1 | 12/2013 | Gulanikar | |
| 2014/0007005 A1 | 1/2014 | Libin | |
| 2014/0025767 A1 | 1/2014 | De Kezel | |
| 2014/0036639 A1 | 2/2014 | Boni | |
| 2014/0040780 A1 | 2/2014 | Brian | |
| 2014/0059910 A1* | 3/2014 | Norton | F41A 15/14 42/9 |
| 2014/0074536 A1 | 3/2014 | Meushar | |
| 2014/0089719 A1 | 3/2014 | Daum | |
| 2014/0101310 A1* | 4/2014 | Savage | H04L 43/00 709/224 |
| 2014/0156539 A1 | 6/2014 | Brunet | |
| 2014/0165001 A1 | 6/2014 | Shapiro | |
| 2014/0208325 A1 | 7/2014 | Chen | |
| 2014/0215344 A1 | 7/2014 | Ligman | |
| 2014/0229609 A1 | 8/2014 | Wong | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0310047 A1 | 10/2014 | De | |
| 2014/0310051 A1 | 10/2014 | Meng | |
| 2014/0350997 A1* | 11/2014 | Holm | G06Q 50/01 705/7.26 |
| 2014/0364987 A1 | 12/2014 | Shikano | |
| 2015/0007058 A1* | 1/2015 | Wooten | H04L 67/38 715/753 |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1* | 4/2015 | Rabinovici | G06F 9/5011 718/104 |
| 2015/0134393 A1 | 5/2015 | De | |
| 2015/0213411 A1 | 7/2015 | Swanson | |
| 2015/0312375 A1 | 10/2015 | Valey | |
| 2015/0317595 A1 | 11/2015 | De | |
| 2015/0339006 A1 | 11/2015 | Chaland | |
| 2015/0363733 A1 | 12/2015 | Brown | |
| 2015/0379472 A1* | 12/2015 | Gilmour | G06Q 10/06 705/7.15 |
| 2016/0012368 A1 | 1/2016 | O'Connell | |
| 2016/0048786 A1 | 2/2016 | Fukuda | |
| 2016/0063449 A1 | 3/2016 | Duggan | |
| 2016/0072750 A1* | 3/2016 | Kass | H04L 51/14 709/206 |
| 2016/0124775 A1 | 5/2016 | Ashtiani | |
| 2016/0140474 A1 | 5/2016 | Vekker | |
| 2016/0140501 A1* | 5/2016 | Figlin | G06Q 10/103 705/7.15 |
| 2016/0147773 A1 | 5/2016 | Smith | |
| 2016/0147846 A1 | 5/2016 | Smith | |
| 2016/0148157 A1* | 5/2016 | Walia | G06Q 10/107 705/300 |
| 2016/0180277 A1 | 6/2016 | Skiba | |
| 2016/0188145 A1* | 6/2016 | Vida | B60K 37/06 715/745 |
| 2016/0224939 A1 | 8/2016 | Chen | |
| 2016/0234391 A1 | 8/2016 | Wolthuis | |
| 2016/0275436 A1* | 9/2016 | Kurjanowicz | G06Q 10/06398 |
| 2016/0313934 A1 | 10/2016 | Isherwood | |
| 2016/0328217 A1* | 11/2016 | Hagerty | H04L 63/102 |
| 2016/0342927 A1 | 11/2016 | Reznik | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0061341 A1 | 3/2017 | Haas | |
| 2017/0068933 A1 | 3/2017 | Norton | |
| 2017/0093874 A1* | 3/2017 | Uthe | G06F 3/0482 |
| 2017/0099296 A1* | 4/2017 | Fisher | H04L 63/104 |
| 2017/0103369 A1 | 4/2017 | Thompson | |
| 2017/0116552 A1 | 4/2017 | Deodhar | |
| 2017/0132200 A1 | 5/2017 | Noland | |
| 2017/0153799 A1 | 6/2017 | Hoyer | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0249577 A1 | 8/2017 | Nishikawa | |
| 2017/0316367 A1* | 11/2017 | Candito | H04L 63/06 |
| 2017/0317898 A1* | 11/2017 | Candito | G06Q 10/103 |
| 2017/0323233 A1 | 11/2017 | Bencke | |
| 2017/0323267 A1* | 11/2017 | Baek | G06Q 10/063114 |
| 2017/0344754 A1 | 11/2017 | Kumar | |
| 2018/0032524 A1 | 2/2018 | Byron | |
| 2018/0053127 A1 | 2/2018 | Boileau | |
| 2018/0059910 A1* | 3/2018 | Wooten | G06F 3/04842 |

(56) References Cited

U.S. PATENT DOCUMENTS

| | | | |
|---|---|---|---|
| 2018/0060785 A1* | 3/2018 | Carnevale | G06Q 10/063112 |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0088754 A1 | 3/2018 | Psenka | |
| 2018/0095938 A1 | 4/2018 | Monte | |
| 2018/0131649 A1 | 5/2018 | Ma | |
| 2018/0157477 A1 | 6/2018 | Johnson | |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0285471 A1 | 10/2018 | Hao | |
| 2018/0357049 A1 | 12/2018 | Epstein | |
| 2018/0373804 A1 | 12/2018 | Zhang | |
| 2019/0005048 A1 | 1/2019 | Crivello | |
| 2019/0034057 A1 | 1/2019 | Rudchenko | |
| 2019/0068390 A1* | 2/2019 | Gross | H04L 12/1827 |
| 2019/0079909 A1 | 3/2019 | Purandare | |
| 2019/0080289 A1 | 3/2019 | Kreitler | |
| 2019/0095839 A1 | 3/2019 | Itabayashi | |
| 2019/0095846 A1 | 3/2019 | Gupta | |
| 2019/0102700 A1 | 4/2019 | Babu | |
| 2019/0138961 A1 | 5/2019 | Santiago | |
| 2019/0147386 A1* | 5/2019 | Balakrishna ... | G06Q 10/063118 705/7.14 |
| 2019/0213509 A1 | 7/2019 | Burleson | |
| 2019/0340296 A1* | 11/2019 | Cunico | G06F 16/36 |
| 2019/0340574 A1 | 11/2019 | Ekambaram | |
| 2019/0347094 A1 | 11/2019 | Sullivan | |
| 2019/0370320 A1 | 12/2019 | Kalra | |
| 2020/0065736 A1 | 2/2020 | Relangi | |
| 2020/0192538 A1 | 6/2020 | Karpe | |
| 2020/0192908 A1 | 6/2020 | Smith | |
| 2020/0218551 A1 | 7/2020 | Sabo | |
| 2020/0328906 A1 | 10/2020 | Raghavan | |
| 2020/0344253 A1 | 10/2020 | Kurup | |
| 2021/0110347 A1* | 4/2021 | Khalil | G06Q 10/063114 |

OTHER PUBLICATIONS

Asana Demo and Product Tour, you tube excerpt, Dec. 7, 2017 https://www.youtube.com.com/?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzylBy (Year: 2019) (1 page).
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2014) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
Biggs, "GateGuru Relaunches With New Ways to Streamline Your Travel Experience", Techcrunch, (Apr. 26, 2013), 3 pgs.
www.cogmotive.com/blog/author/alan Alan Byrne: "Creating a company Shared Calendar in Office 365"; pp. 1-17; Sep. 10, 2013.
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
www.asana.com (as retrieved from https://web.archive.Org/web/20160101054536/https://asana.com/press and https://web.archive.org/web/20160101054527/https://asana.com/product) (Year: 2016) 15 pages.
"How to Asana: Inviting teammates to Asana." YouTube, Asana, Mar. 21, 2017, https://www.youtube.com/watch?v=TLOruY1KyxU ( Year: 2017), 13 pages.
Hartmann, "TimeProjectscheduling with resource capacities and requests varying with time: a case study," 2013, Flexible services and manufacturing journal, vol. 25, No. 1, pp. 74-93 (Year: 2013).

(56) References Cited

OTHER PUBLICATIONS

Paul Minors, How to automate your tasks, youtube excerpts, Oct. 18, 2019 https://www.youtube.com/watch?v=lwF9XyUQrzw (Year: 2019).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Assef, F., Cassius, T. S., & Maria, T. S. (2018). Confrontation between techniques of time measurement. Journal of Manufacturing Technology Management, 29(5), 789-810. (Year: 2018).

\* cited by examiner

SYSTEMS AND METHODS FOR PROVIDING A DASHBOARD FOR A COLLABORATION WORK MANAGEMENT PLATFORM

FIELD OF THE DISCLOSURE

The present disclosure relates to systems and methods for providing a dashboard for a collaboration work management platform.

BACKGROUND

Typical work management platforms present tasks or to-do items to the user that is to perform the tasks or to-do items. Often, higher level management has difficulty obtaining a snapshot or overview of the projects or tasks they manage that other users perform.

Data related to managers is typically limited to employee feedback or review, and overall work product success. Data representing how managers actually manage and/or interact with the employees that work for them and/or the projects they are working has historically been unavailable.

SUMMARY

Managers and/or higher level employees that oversee and manage the work being performed by other users are often associated with several projects and/or tasks at a high level. These managers and higher level employees may ultimately be responsible for ensuring the projects and tasks are completed on schedule, but often struggle to do so because of the existing methods and graphical user interfaces for presenting work related information to users. The present disclosure relates to an improved user interface comprising a dashboard for displaying specialized work information for units of work (e.g., projects, tasks, portfolios, and/or other units of work) a given user is associated with (e.g., managing and/or overseeing) but not assigned to (e.g., not actually performing the activities and/or actions for the units of work). The improved graphical user interface also enables user interactions and behaviors that previously were not tracked on a managerial/overseer's level, to be tracked and analyzed to determine metrics and provide insight into how employees manage and oversee work.

One aspect of the present disclosure relates to a system configured to provide a dashboard for a collaboration work management platform. The system may include one or more hardware processors configured by machine-readable instructions. The processor(s) may be configured to manage environment state information for maintaining a collaboration environment. The environment state information may include user records, work unit records, and/or other records. The environment state information may define a state of the collaboration environment including user states, a work unit state, and/or other states. The user states may be defined by the user records that define values of user parameters associated with users interacting with and viewing the collaboration environment. The work unit states may be defined by the work unit records that define values of work unit parameters for units of work managed, created, and/or assigned within the collaboration environment.

The work unit records may define the values of the work unit parameters for individual units of work within sets of units of work. A user may be associated with the individual units of work within a given set. Being associated with the individual units of work within a given set may indicate the user has a higher level of responsibility for the individual units of work within the given set than other users that are assigned to the units of work. The one or more other users that are assigned to the units of work may be responsible for performing the activities and/or actions for the units of work. The one or more processor(s) may be configured to obtain a first set of units of work where a first user is associated with first units of work within the first set. The first user may be not assigned to the first units of work, but may be associated with the first units of work. One or more other users may be assigned to the first units of work.

The processor(s) may be configured to effectuate presentation of a dashboard displaying work information for the first units of work within the first set. A dashboard presented to a given user may include work information for units of work the given user is associated with. The dashboard presented to the given user may include work information of units of work that other users, rather than the given user, are assigned to. The work information may be based on the work unit records and indicate titles for the first units of work within the first set, statuses of the first units of work within the first set, user information for the one or more other users assigned to the first units of work within the first set, and/or other information.

In some implementations, a system configured to provide a dashboard for a collaboration work management platform may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, a work unit component, a dashboard component, a presentation component, a notification component, and/or other components.

The environment state component may be configured to manage environment state information for maintaining a collaboration environment. The environment state information may include user records, work unit records, and/or other records. The environment state information may define a state of the collaboration environment including user states, work unit states, and/or other states. The user states may be defined by the user records. The user records may define values of user parameters associated with users interacting with and viewing the collaboration environment. The work unit states may be defined by the work unit records that define values of work unit parameters for units of work managed, created, and/or assigned within the collaboration environment.

The work unit records may define the values of the work unit parameters for individual units of work within sets of units of work. The sets of units of work may include individual units of work that are associated with individual users. A user may be associated with the individual units of work within a given set such that the user has a higher level of responsibility for the individual units of work within the given set than other users that are assigned to the units of work. The other users that are assigned to the units of work may be responsible for performing the activities and/or actions for completing the units of work. The given user may be responsible for managing, monitoring, and/or ensuring overall progress of the individual units of work within the given set.

In some implementations, the work unit records may define values of the work unit parameters for individual subunits of work that correspond to the individual units of work within a given set. The individual ones of the first units of work within the first set may have corresponding first subunits of work. The first user may not be assigned to the first subunits of work but one or more other users may be assigned to the first subunits of work.

The work unit component may be configured to obtain a first set of units of work. The first set of units of work may include first units of work within the first set. The first user may be associated with the first units of work within the first set. The first user may not be assigned to the first units of work within the first set, but one or more other users may be assigned to the first units of work within the first set. In some implementations, obtaining the first set of units of work may include determining the first units of work that are associated with the first user to be included in the first set based on the user records, the work unit records, and/or other records.

In some implementations, the work unit component may be configured to obtain a second set of units of work were first user is associated with second units of work within the second set. The first user may not be assigned to the second units of work, but one or more other users may be assigned to the second units of work.

The presentation component may be configured to effectuate presentation of a dashboard displaying work information for the first units of work within the first set. The work information displayed via the dashboard for the first set of units of work may include and/or indicate titles for the first units of work within the first set, statuses of the first units of work within the first set, user information for the one or more other users assigned to the first units of work within the first set, due date information for the first units of work, start date information for the first units of work, priority information for the first units of work, stage of the first units of work, and/or other information. In some implementations, the statuses of the first units of work may be indicated via colored status indicators within the dashboard (e.g., green—on track, yellow—at risk, red—off track, etc.).

In some implementations, presentation of a second dashboard displaying work information for the second units of work within the second set may be effectuated. The second dashboard may display work information for the second units of work within the second set. The work information may be based on the work unit records. The work information for the second units of work may indicate titles for the second units of work, statuses of the second units of work within the second set, user information for the one or more other users assigned to the second units of work, due date information for the second units of work, start date information for the second units of work, priority information for the second units of work, stage of the second units of work, and/or other information.

In some implementations, the dashboard may include one or more drop-down buttons corresponding to individual ones of the first units of work within the first set. Responsive to a user selecting a drop-down button corresponding to a first unit of work, the work information for first subunits of work corresponding to the first unit of work may be presented. The work information for the first subunits of work may include title for the first subunits of work, statuses of the first subunits of work, user information for the one or more other users assigned to the first subunits the work, due date information for the first subunits of work, and/or other information.

In some implementations, the dashboard may include contact buttons corresponding to individual ones of the units of work and/or individual ones of the corresponding subunits of work. The contact buttons may be used to initiate a notification reminding the one or more other users assigned to the units of work and/or the corresponding subunits of work to provide a reminder and/or request a status update related to the units of work and/or the corresponding subunits of work.

The dashboard component may be configured to generate the dashboard for displaying the work information for the first units of work within the first set. In some implementations, the dashboard component may be configured to monitor interactions of the first user with the first units of work. Dashboard component may be configured to determine one or more metrics characterizing the interactions of the first user with the first units of work. The one or more metrics may include a quantity of follow-ups, a follow-up frequency, a time period between follow-ups, follow-up timing, which users receive follow-ups, a quantity of views, viewing frequency, and/or other metrics characterizing follow-ups and/or other interactions of the first user with the first units of work.

Notification component may be configured to generate a first notification for the first unit of work responsive to a user selecting a first contact button corresponding to the first unit of work. The first notification may include a reminder and/or status update request for the first unit of work. The first notification may be from and/or indicated as being from the user that selected the first contact button (e.g., the first user).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
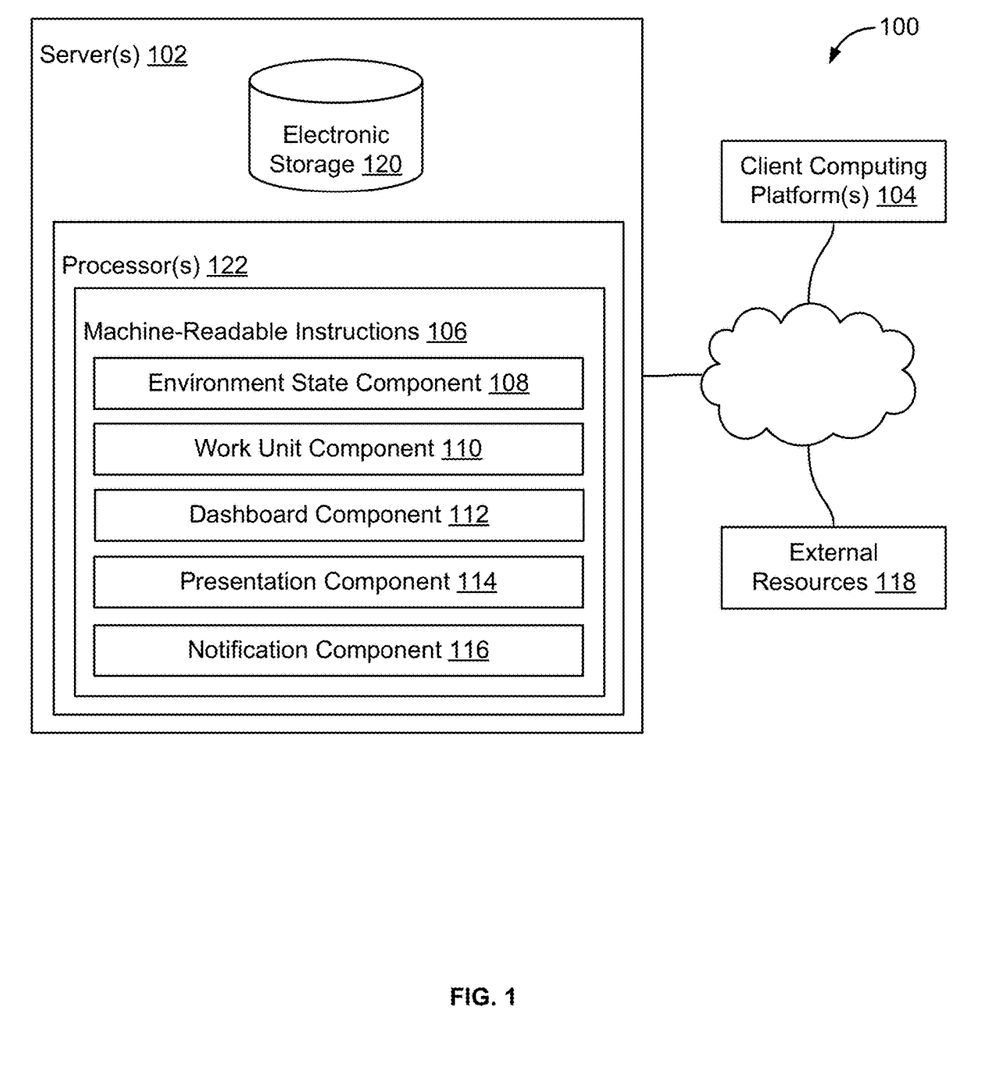
FIG. 1 illustrates a system configured to provide a dashboard for a collaboration work management platform, in accordance with one or more implementations.

FIG. 1 illustrates a system 100 configured to provide a dashboard for a collaboration work management platform, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an environment state component 108, a work unit component 110, a presentation component 114, a notification component 116, and/or other instruction components.

As is illustrated in FIG. 1, system 100 may include one or more of: one or more servers 102, one or more client computing platforms 124, external resources 122, and/or other components for providing a dashboard representing workflow for a collaboration work management platform. Users may interact with system 100 via one or more client computing platforms 124. The one or more servers 102 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, a television set-top box, smart TV, a gaming console, and/or other client computing platforms.

Environment state component 108 may be configured to manage environment state information for maintaining a collaboration environment. By way of non-limiting example, the work unit states may be defined by the work unit records that define values of work unit parameters for units of work managed, created, and/or assigned within the collaboration environment. In some implementations, the work unit state may include a project state, a task state, a sub-tasks state, and/or other states. The work unit records may include project records, task records, sub-task records, and/or other records.

The environment state information may include user records and work unit records. The environment state information may define a state of the collaboration environment including user states and work unit states. The user states may be defined by the user records that define values of user parameters associated with users interacting with and viewing the collaboration environment. The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a user role, a user department, descriptive user content, a to-email, a from-email, a photo, an organization, a workspace, one or more projects (which may include project parameters defined by one or more work unit records); one or more items of work (which may include one or more work item parameters defined by one or more work item records), one or more user comments, one or more teams the user belongs to, one or more of the user display settings (e.g., colors, size, project order, task order, other work unit order, etc.), one or more authorized applications, one or more presence/interaction parameters (e.g., indicating presence and/or interaction level at an environment level, work unit level, project level, task all, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, other user parameters for the given user, and/or other user parameters and/or work unit parameters, for one or more work units the given user is associated with.

The work unit parameters for work units managed created, and/or assigned within the collaboration environment may include parameters describing one or more work units managed, created, and/or assigned within the collaboration environment and/or via the collaboration work management platform, and/or the metadata associated with the one or more work units. Individual ones of the work units may be associated with individual ones of the work unit records. A work unit record may define values of the work unit parameters associated with a given work unit managed, created, and/or assigned within the collaboration environment and/or via the collaboration work management platform. A given work unit may have one or more owners and/or one or more team members working on the given work unit. Work units may include one or more to-do items, action items, objectives, and/or other units of work one or more users should and/or plan on accomplishing. Units of work may be created by a given user for the given user and/or created by the given user and assigned to one or more other users. A given work unit may include one or more projects, tasks, sub-tasks, portfolios (e.g., a grouping or set of work units), and/or other units of work assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, upvotes, other hard-coded responses, etc.), a work unit name, a work unit description, one or more work unit dates (e.g., a start date, a due date, a completion date, and/or other work unit dates), one or more members associated with a unit of work (e.g., an owner, one or more other project/task members, member access information, and/or other work unit members and/or member information), a status and/or progress (e.g., an update, a hardcoded status update, a measured status, quantity of work units remaining in a given project, completed work units in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.,), state of a workspace for a given unit of work (e.g., application state parameters, application status, application interactions, user information, and/or other parameters related to the state of the workspace for a unit of work), dependencies between one or more work units, one or more custom fields (e.g., priority, cost, stages, and/or other custom fields), other work unit parameters for the given work units, and/or other work unit parameters, and/or user parameters for one or more users and/or work units the given project is associated with.

It is noted that any metadata and/or values of parameters related to any users, units of work, projects, tasks, subtasks, portfolios (e.g., a grouping or set of work units), and/or other units of work may be considered values of user parameters and/or work unit parameters. The terms "user parameters" and/or "work unit parameters" may be used interchangeably herein.

Work unit component 110 may be configured to obtain a first set of units of work. A first user may be associated with first units of work within the first set. A user may be associated with the individual units of work within the given set such that the user has a higher level of responsibility for the individual units of work within the given set than other users that are assigned to the units of work and responsible for performing the activities and actions for the units of work. By way of non-limiting example, a given user being associated with individual units of work may indicate the given user manages the given units of work, is responsible for the individual units of work, and/or oversees other users performing the activities and/or actions for the individual units of work. The individual units of work within a given set may be associated and/or related to one another, and/or may have one or more characteristics in common. The individual units of work within a given set may be associated with the given user, associated with the same department, part of the same larger project, associated with the same product or goal, associated with a set of users associated with the given user (e.g., a team or group of users overseen or managed by the given user), and/or otherwise associated with, related to, and/or having one or more characteristics in common with one another. By way of non-limiting example, the individual units of work may include projects, tasks, portfolios (e.g., a grouping or set of work units), and/or other units of work.

The first set of units of work (e.g., a portfolio or multiple nested portfolios represented via a given dashboard) may have metadata associated with the first set of units of work (e.g., the portfolio). For example, one or more users (e.g., a team), date information (e.g., a due date or completion date for the first set of units of work), status information (e.g., a status color) for the first set, a description for the first set, and/or other metadata. The metadata may be automatically determined and/or determined by a user based on the user records, the work unit records, user input, and/or other information Obtaining the first set of units of work may include determining the first units of work that are associated with the first user to be included in the first set. Determining the first units of work to be included in the first set may be based on the user records and the work unit records. In some implementations, obtaining the first set of units of work may include receiving user input indicating the first units of work that are associated with the first user to be included in the first set. In some implementations, obtaining the first set of units of work may include receiving user input indicating selection of one or more units of work to include and/or add to the first set of units of work. Work unit component 110 may be configured to determine one or more suggestions for units of work that should be included and/or added to the first set of units of work. The one or more suggestions may be presented to a user to facilitated user selection of the one or more suggested units of work to include and/or add in the first set of units of work.

In some implementations, the individual ones of the first units of work within the first set may have corresponding first subunits of work. Responsive to the first units of work including projects, the corresponding first subunits of work may include tasks within the individual projects. In some implementations, the units of work may include portfolios comprising multiple other units of work and/or subunits of work. The portfolios may include a grouping or set of units of work and/or sub units of work associated with a given user (e.g., the first user, etc.).

The first user may not be assigned to the first subunits of work, but one or more other users may be assigned to the first subunits of work. By way of non-limiting example, a given user being associated with individual subunits of work may indicate the given user manages the given subunits of work and/or the corresponding units of work, is responsible for the individual subunits of work and/or the corresponding units of work, and/or oversees other users performing the activities and/or actions for the individual subunits of work and/or the corresponding units of work.

In some implementations, work unit component 110 may be configured to obtain a second set of units of work. The first user may be not assigned to the second units of work. One or more other users may be assigned to the second units of work. The first user may own, manage, and/or oversee the second units of work within the second set. Obtaining the second set of units of work may include receiving user input indicating the second units of work that are associated with the first user to be included in the second set.

In some implementations, dashboard component 112 may be configured to generate one or more dashboards for individual users within the collaboration work management platform. The one or more dashboards may include a first dashboard displaying work information for the first units of work within the first set generated for the first user. By way of non-limiting example, the first dashboard may include a list of the first units of work within the first set along with corresponding metadata for the first units of work. The corresponding metadata for the first units of work may include at least some of the work information for the first units of work associated with the first user for which the first dashboard is generated.

The work information displayed via the dashboard may include user information for the one or more other users that are assigned to the first subunits of work and responsible for performing the activities and actions for the subunits of work. The dashboard may include contact buttons corresponding to individual ones of the first units of work. The dashboard may include one or more drop down buttons such that responsive to the first user selecting a first drop down button corresponding to a first unit of work, the work information for the first subunits of work corresponding to the first units of work is presented. By way of non-limiting example, the work information for the first subunits of work may include titles for the first subunits of work, statuses of the first subunits of work, user information for the one or more other users assigned to the first subunits of work, and/or due date information for the first subunits of work. The dashboard may configurable such that a user may customize the dashboard view. For example, if the user wants to share the dashboard with another user, the user may only want certain information (e.g., certain work information, status information, and/or other information) presented via the dashboard.

In some implementations, the dashboard may include one or more visual charts and/or graphs based on the work information and/or metadata associated with the one or more units of work within a set of units of work. By way of non-limiting example, individual units of work (e.g., projects, tasks, and/or other units of work) may be included in a pie chart illustrating status (e.g., red, yellow, green, and/or other status indicators) of the units of work (e.g., projects, tasks, and/or other units of work) within a given set of units of work (e.g., a portfolio and/or other set of units of work).

Presentation component 114 may be configured to effectuate presentation of one or more dashboards for displaying work information for units of work within one or more sets of units of work associated with a given user. Presentation component 114 may be configured to effectuate presentation of a dashboard displaying work information for the first units of work within the first set. The first dashboard may include a list of the first units of work within the first set and corresponding metadata for the first units of work. The corresponding metadata may include at least some of the work information for the first units of work. The work information displayed via the dashboard may indicate titles for the units of work within the given set displayed via the dashboard, statuses of the units of work within the given set displayed via the dashboard, user information for the one or more other users assigned to the units of work within the given set displayed via the dashboard, due date information for the units of work within a given set displayed via the dashboard, and/or other work information. The work information may be based on the work unit records. By way of non-limiting example, the work information for the first units of work included in the first dashboard may indicate titles for the first units of work within the first set, statuses of the first units of work within the first set, user information for the one or more other users assigned to the first units of work within the first set, due date information for the first units of work, and/or other information for the first units of work.

In some implementations, dashboard component 112 may be configured to effectuate presentation of a second dashboard displaying work information for second units of work within a second set. The work information may indicate titles for the second units of work within the second set, statuses of the second units of work within the second set, user information for the one or more other users assigned to the second units of work within the second set, due date information for the second units of work within the second set, start date information for the second units of work within the second set, priority information for the second units of work, stage of the second units of work, and/or other information and/or other information for the second units work with and the second set.

In some implementations, the statuses of the units of work may be indicated via colored status indicators, shape indicators, and/or other indicators within the dashboard. By way of non-limiting example, the colored status indicators may include a red indicator indicating the corresponding unit of work is off-track and/or behind schedule, a yellow indicator indicating the corresponding unit of work is at risk of being off-track and/or behind schedule, a green indicator indicating the corresponding unit of work is on track and/or on schedule, and/or other colored indicators.

The work information displayed via the dashboard may include user information for the one or more other users that are assigned to the first units of work and/or the first subunits of work. The user information may include a user name, a department, a title, a location, an availability, and/or other user information for the one or more other users that are assigned to the first units of work and/or the first subunits of work. Users that are assigned to the first units of work and/or the first subunits of work may be responsible for performing the activities and/or actions for completing the first units of work and/or the first subunits of work. The dashboard may include contact buttons corresponding to individual ones of the first units of work.

In some implementations, the dashboard may include one or more drop down buttons corresponding to individual ones of the units of work. The one or more drop down buttons may initiate display of work information for the subunits of work corresponding to a given unit of work. For example, responsive to the first user selecting a first drop down button corresponding to a first unit of work, the work information for the first subunits of work corresponding to the first units of work is presented. By way of non-limiting example, the work information for the first subunits of work display responsive to selection of a drop down button may include titles for the first subunits of work, statuses of the first subunits of work, user information for the one or more other users assigned to the first subunits of work, due date information for the first subunits of work, and/or other work information for the first subunits of work.

In some of limitations, the dashboard may include contact buttons corresponding to individual ones of the units of work and/or subunits of work. The users may select individual contact buttons in order to initiate a notification for the corresponding unit of work and/or subunit of work. The contact buttons may include GUI buttons and/or other interface features that are selectable by the uses. By way of non-limiting example, the first user may select a first contact button corresponding to a first unit of work within the first dashboard.

Figure 2A:
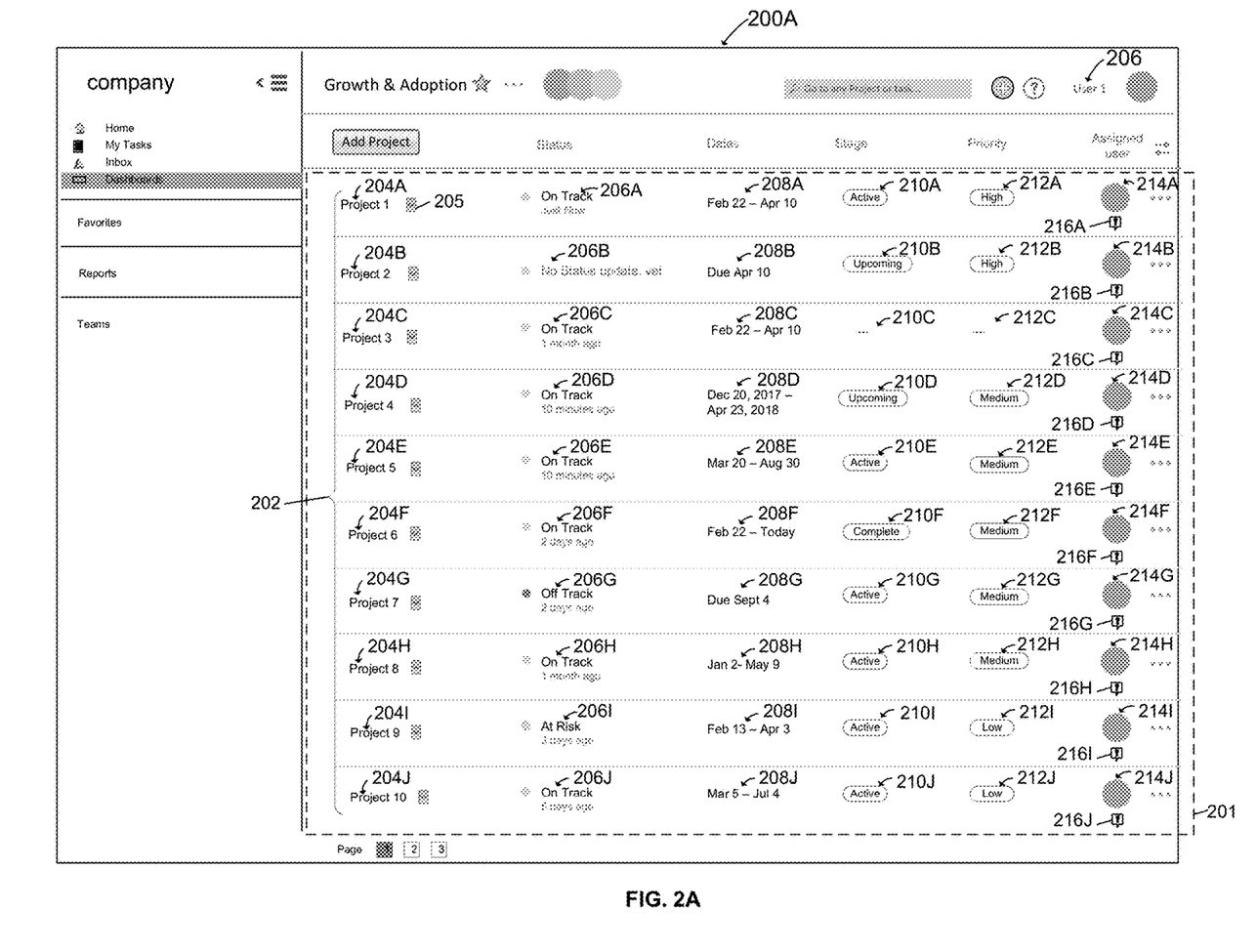
FIG. 2A illustrates a dashboard for a collaboration work management platform, in accordance with one or more implementations.

FIG. 2A illustrates a dashboard for a collaboration work management platform, in accordance with one or more implementations. Dashboard 200 may display work information 201 for units of work 204 within set 202. Work information 201 for units of work 204 within set 202 may be displayed in rows corresponding to individual ones of the units of work 204. Dashboard 200 may display units of work 204 that are associated with User 1 206, but assigned to one or more other users indicated by user information 214. Units of work 204 within set 202 may be related to and/or associated with one another. By way of non-limiting example, units of work 204 within set 202 may be projects related to product Growth and Adoption.

Work information 201 displayed within dashboard 200 may include titles for units of work 204, statuses 206, due dates and/or start dates 208, stage information 210, priority information 212, user information 214, and/or other information for units of work 204 associated with User 1 206 within set 202. Dashboard 200 may include drop down buttons 205 corresponding to individual ones of units of work 204. Dashboard 200A may include contact buttons 216 corresponding to the units of work 204.

Figure 2B:
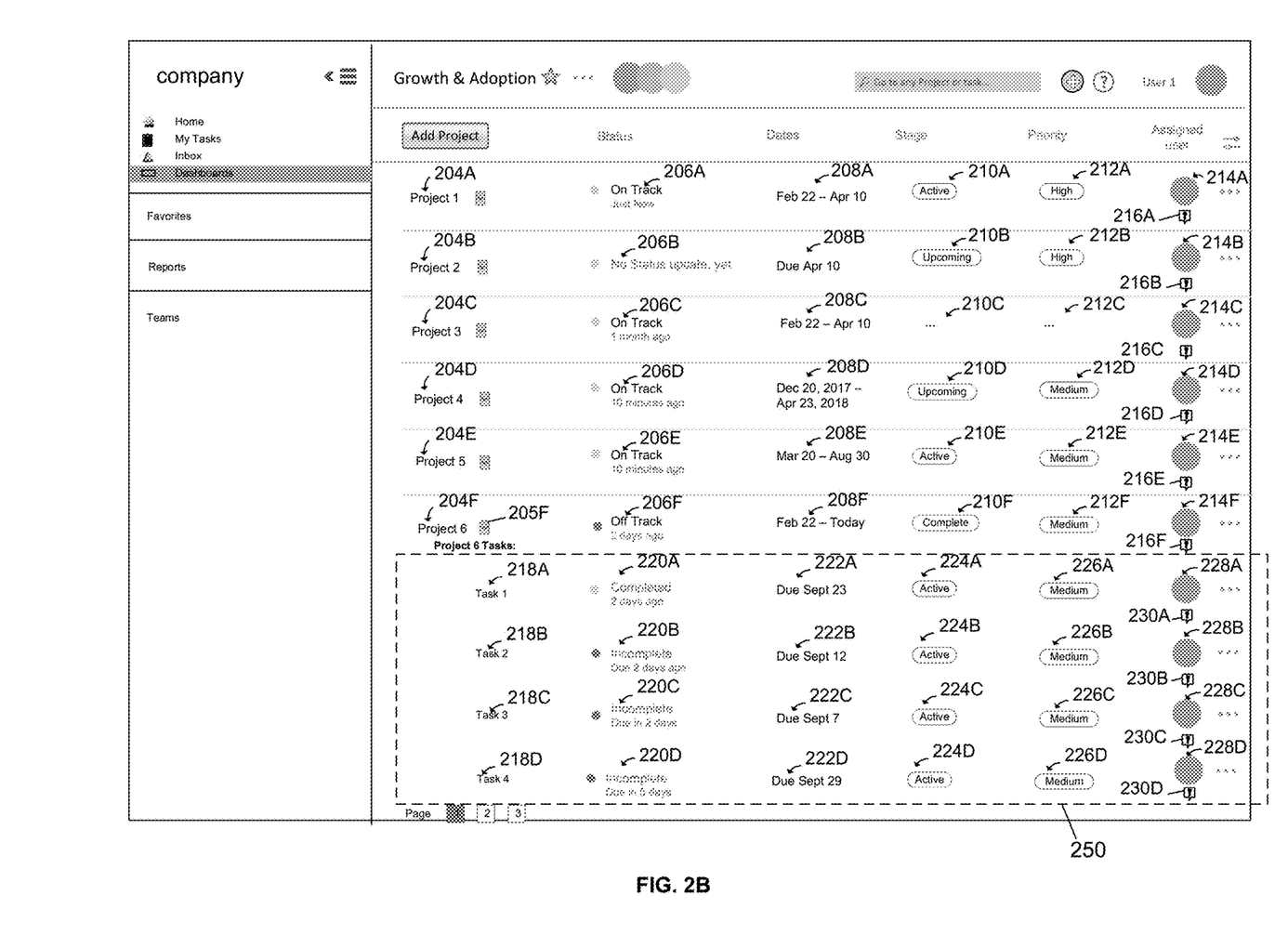
FIG. 2B illustrates a dashboard for a collaboration work management platform, in accordance with one or more implementations.

FIG. 2B illustrates a dashboard for a collaboration work management platform, in accordance with one or more implementations. Dashboard 200B may display work information 250 for one or more subunits of work 218 (e.g., tasks 1-4) corresponding to unit of work 204F (e.g., Project 6). Work information 254 for subunits of work 218 may be presented responsive to a user (e.g., User 1 206) selecting drop down button 205F. Work information 254 for subunits of work 218 may be displayed in rows corresponding to individual ones of the subunits of work 218.

Work information 250 displayed within dashboard 200 may include titles for subunits of work 218, statuses 220, due dates and/or start dates 222, stage information 224, priority information 226, user information 228, and/or other information for subunits of work 218 associated with User 1 206 and/or corresponding to unit of work 204F (e.g., Project 6). Dashboard 200B may include contact buttons 230 corresponding to the subunits of work 218.

Returning to FIG. 1, notification component 116 may be configured to generate, one or more notifications for individual units of work and/or subunits of work. Notification component 116 may be configured to generate a first notification for the first unit of work. The first notification may be generated responsive to the first user selecting a first contact button corresponding to a first unit of work. The notification may include a reminder, custom message, and/or status update request for the first unit of work from the first user. The notifications may be automatically generated, editable by the given user initiating the notifications, and/or drafted by the given user initiating the notifications. The one or more notifications initiated via the dashboard and or generated by notification component 116 may be transmitted to the one or more other users assigned to the corresponding units of work and/or subunits of work. By way of non-limiting example, the first notification may include work information for the first unit of work may be presented in the first notification. The first notification may include a reminder and/or status update request for the first unit of work. Notification component 116 may be configured to transmit the first notification to a second user assigned to the first unit of work. The first notification may be from and/or indicated as being from the user that selected the first contact button (e.g., the first user).

In some implementations, when presented to the second user, the first notification may include one or more suggestions for responding to the first notification. For example, the first notification may include one or more units of work (e.g., milestones and/or tasks) to update in response to the first notification.

In some implementations, a second contact button corresponding to a first subunit of work may be presented to the first user responsive to the first user initiating a drop down button corresponding to a first unit of work. The first user may select the second contact button to initiate generation of a second notification for the first subunit of work. The second notification may be generated and/or transmitted to a third user assigned to the first subunit of work.

Figure 3:
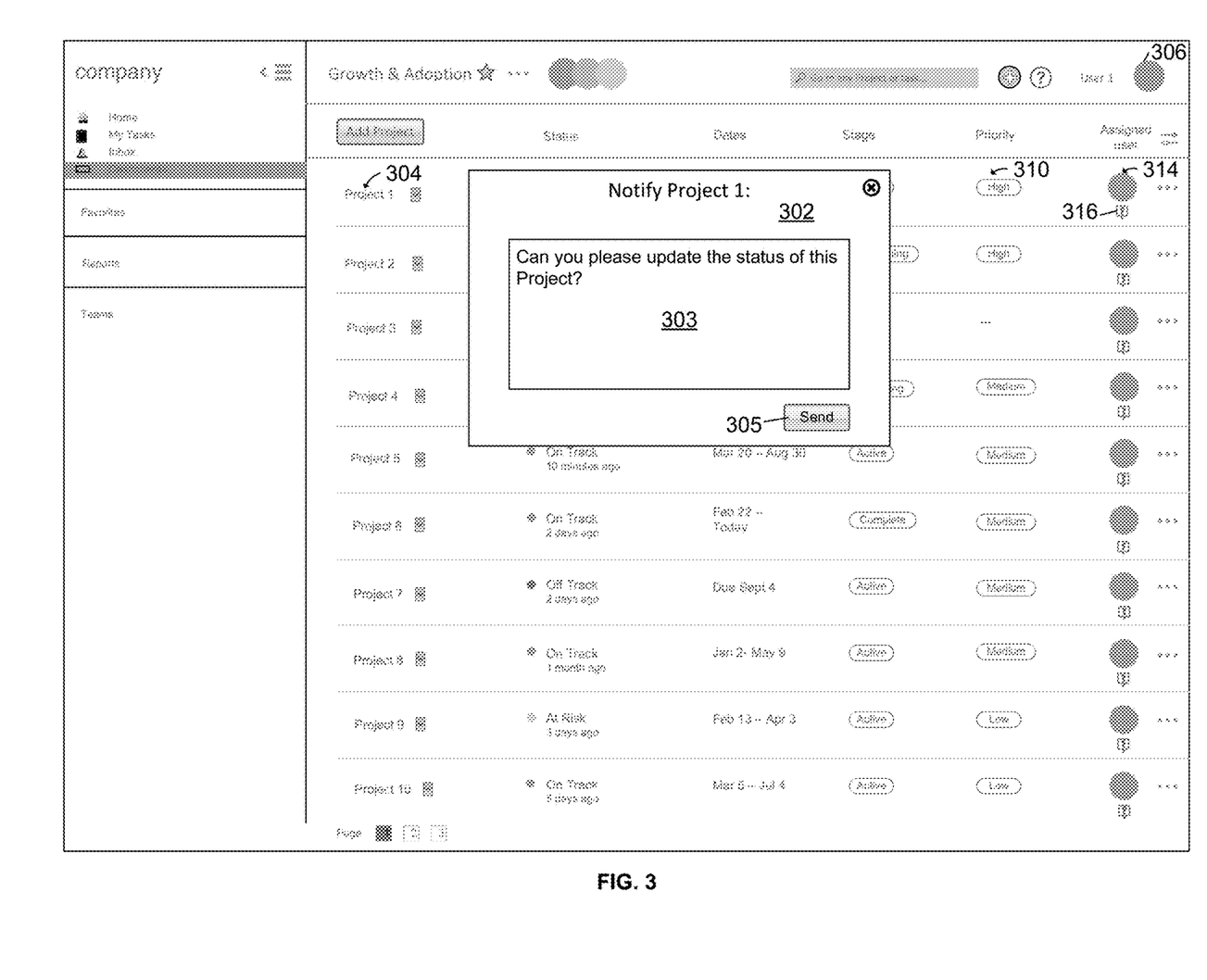
FIG. 3 illustrates a notification within a dashboard for a collaboration work management platform, in accordance with one or more implementations.

FIG. 3 illustrates a notification within a dashboard for a collaboration work management platform, in accordance with one or more implementations. Notification 302 may be generated responsive to User 1 306 selecting contact button 316. Notification 302 may include an automatically generated notification message 303. User 1 306 may be able to edit notification message 303 prior to sending to the user that is assigned to unit of work 304 (e.g., Project 1) as indicated by user information 314. Send button 305 may be selected by User 1 306 once notification message 303 is ready to be transmitted to the user assigned to unit of work 304 as indicated by user information 314.

Figure 4:
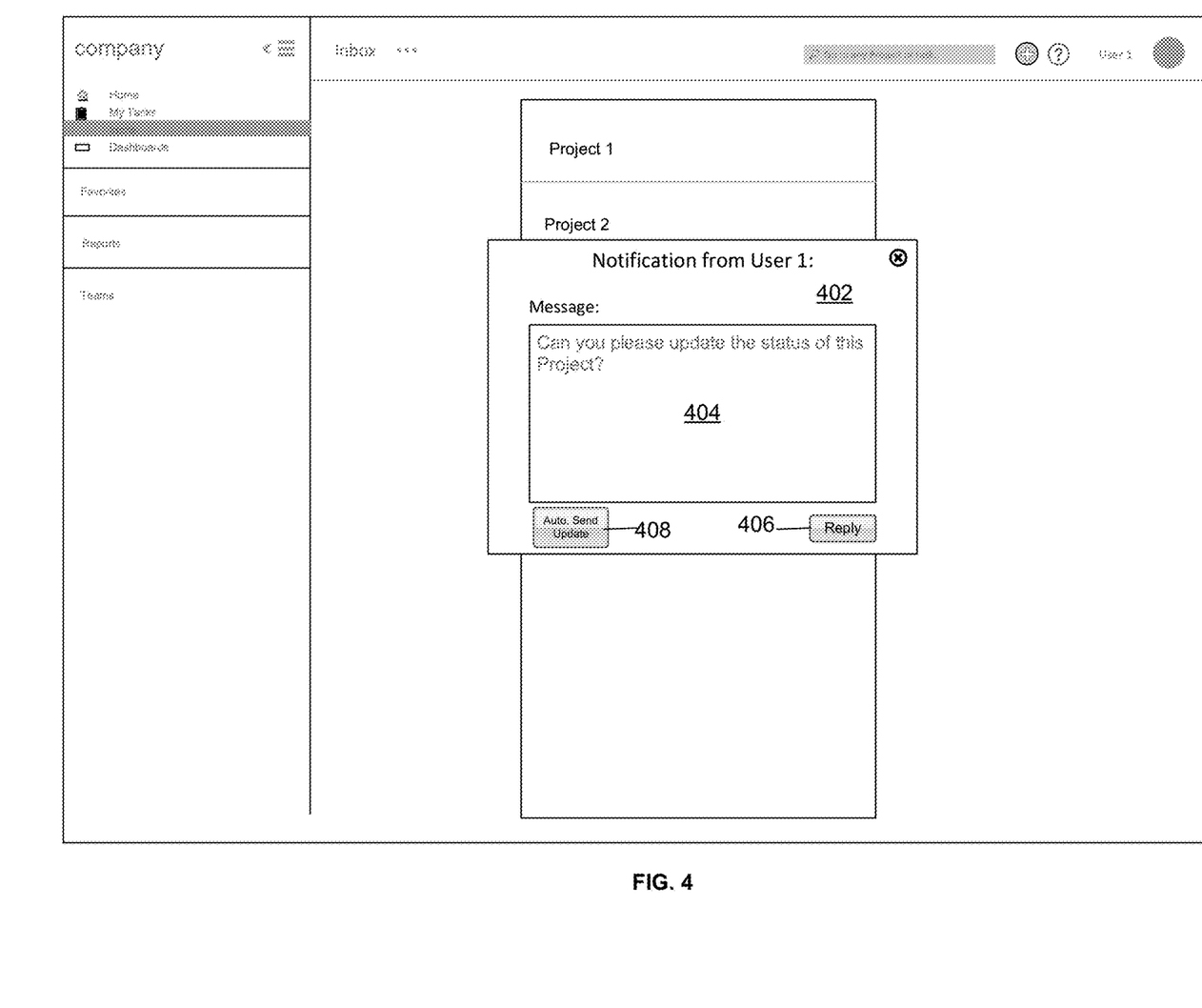
FIG. 4 illustrates a transmitted notification, in accordance with one or more implementations.

FIG. 4 illustrates a transmitted notification, in accordance with one or more implementations. Notification 402 for Project 1 may be transmitted to the user assigned to Project 1. Notification 402 may be from User 1 and include the final notification message 404. User 410 may respond to notification 402 by selecting reply button 406 and/or update button 408. Reply button 406 may initiate a new message window for drafting a response to notification 402. Update button 408 may trigger and automatic update to be sent to User 1 based on recent progress, actions, and/or activities performed related to Project 1.

Returning to dashboard component 112, dashboard component 112 may be configured by machine readable instructions to monitor interactions of the first user with the first units of work and/or corresponding subunits of work. Interactions of the given user with the given units of work and/or the given subunits of work may include views, clicks (e.g., drop down menu selections, contact button selections, unit of work selections, subunit of work selections, and/or other selections and/or user input/clicks received via the dashboard), follow-up initiations and/or notifications sent and/or received, and/or other interactions.

Dashboard component 112 may be configured by machine readable instructions to determine one or more metrics characterizing the interactions of the given user (e.g., the user associated with the units of work presented via the given dashboard) with the units of work and/or subunits of work displayed via the given dashboard. The one or more metrics may include and/or indicate a quantity of follow-ups, a frequency of follow-ups, a time period between follow-ups, the timing of follow-ups, which users receive follow-ups, and/or other metrics characterizing interactions of the given user with units of work and/or subunits of work displayed within their dashboard. By way of non-limiting example, dashboard component 112 may be configured to determine which days of the week and/or times of the day a given user is most likely to initiate follow-ups; how frequently the given user initiates follow-ups in total, on a work unit level, and/or on a set of work units level; how long the user waits before initiating another follow-up after an initial follow-up for the same unit of work and/or subunit of work. Dashboard component 112 may be configured to determine which other users have received the more follow-ups and/or receive follow-ups more often relative to one another.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, 112, 114, and/or 116, and/or other components. Processor(s) 122 may be configured to execute components 108, 110, 112, 114, and/or 116, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 122 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 122 may be configured to execute one or more additional components that may perform some or all of the functionality attributed below to one of components 108, 110, 112, 114, and/or 116.

Figure 5:
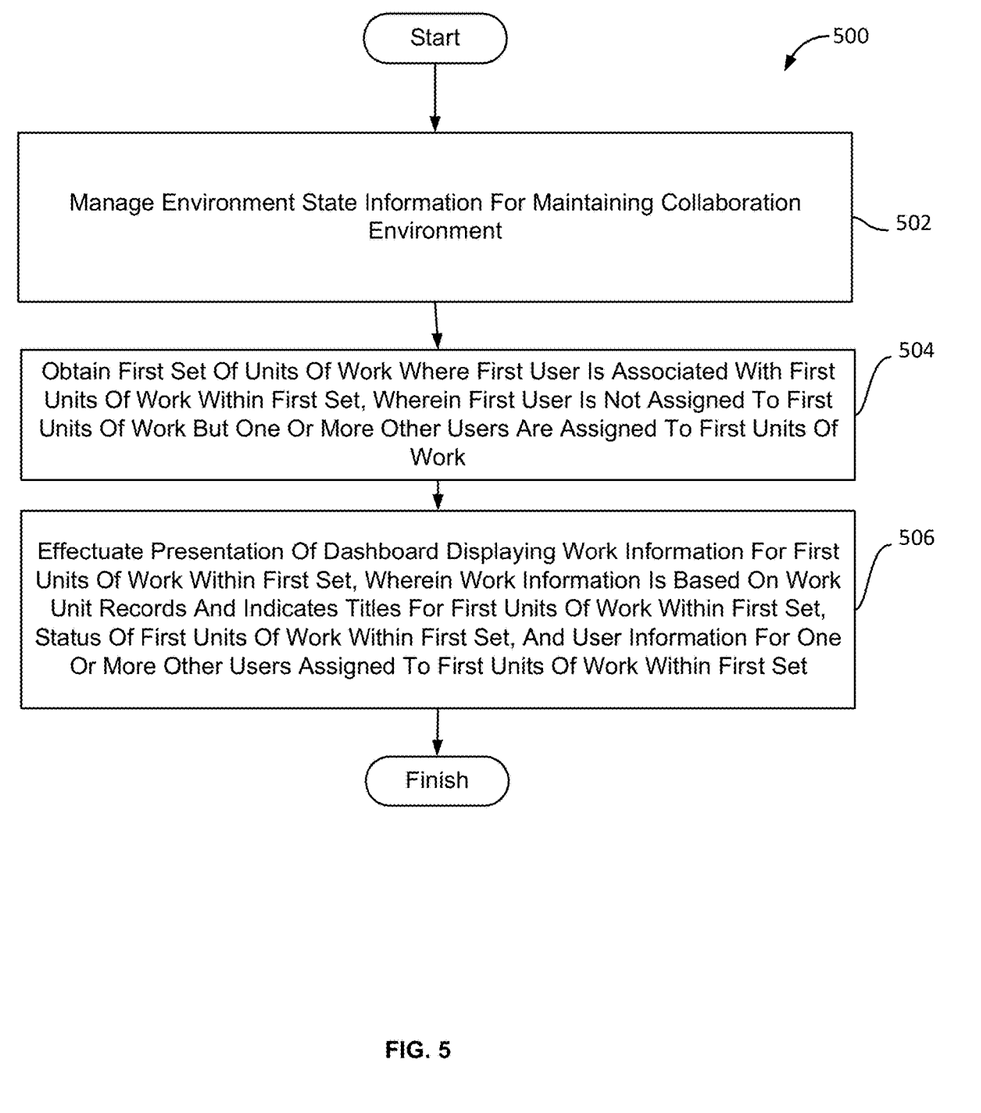
FIG. 5 illustrates a flow chart of a method for providing a dashboard for a collaboration work management platform, in accordance with one or more implementations.

FIG. 5 illustrates a method 500 for aligning a three-dimensional model of a surgical site, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include managing environment state information for maintaining a collaboration environment. The environment state information may include user records and work unit records. The environment state information may define a state of the collaboration environment including user states and work unit states. Operation 502 may be performed by one or more hardware processors configured by machine-readable instructions including a component that is the same as or similar to environment state component 108, in accordance with one or more implementations.

An operation 504 may include obtaining a first set of units of work where a first user is associated with first units of work within the first set. The first user may be not assigned to the first units of work but one or more other users may be assigned to the first units of work. Operation 504 may be performed by one or more hardware processors configured by machine-readable instructions including a component that is the same as or similar to work unit component 110, in accordance with one or more implementations.

An operation 506 may include effectuating presentation of a dashboard displaying work information for the first units of work within the first set. The work information may be based on the work unit records and indicate titles for the first units of work within the first set, statuses of the first units of work within the first set, and user information for the one or more other users assigned to the first units of work within the first set. Operation 506 may be performed by one or more hardware processors configured by machine-readable instructions including a component that is the same as or similar to presentation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing a dashboard representing workflow for a collaboration work management platform, the system comprising:
one or more physical computer processors configured by machine-readable instructions to:
manage environment state information for maintaining a collaboration environment, the environment state information including user records and work unit records, the environment state information defining a state of the collaboration environment including user states and work unit states, wherein the user states are defined by the user records that define values of user parameters associated with users interacting with and viewing the collaboration environment, and wherein the work unit states are defined by the work unit records that define values of work unit parameters for units of work managed within the collaboration environment, created within the collaboration environment, and assigned within the collaboration environment, the work unit records defining the values of the work unit parameters for individual units of work within sets of units of work, wherein an individual user is associated with the individual units of work within a given set of units of work such that the individual user has a higher level of responsibility for the individual units of work within the given set of units of work than other users that are assigned to the units of work and responsible for performing activities and actions for the units of work within the given set of units of work;
identify a first user;
identify a first set of units of work;
determine which of the units of work within the first set of units of work the first user is associated with but not assigned to by virtue of the first user having the higher level of responsibility, such that a first subset of units of work within the first set of units of work is determined to be associated with the first user by virtue of the first user having the higher level of responsibility for the first subset of units of work, wherein the first user is not assigned to the first subset of units of work such that one or more of the other users are assigned to the first subset of units of work;
obtain work information for the first subset of units of work within the first set of units of work, wherein the work information is based on the work unit records and indicates titles for the first subset of units of work within the first set of units of work, statuses of the first subset of units of work within the first set of units of work, and user information for the one or more of the other users assigned to the first subset of units of work within the first set of units of work; and
effectuate presentation of a dashboard displaying the work information for the first subset of units of work within the first set of units of work.

2. The system of claim 1, wherein the dashboard includes contact buttons corresponding to the individual units of work of the first subset of units of work.

3. The system of claim 2, wherein the one or more physical computer processors are further configured by the machine-readable instructions to:
generate, responsive to the first user selecting a first contact button corresponding to a first unit of work, a first notification for the first unit of work; and
transmit the first notification to a second user assigned to the first unit of work.

4. The system of claim 3, wherein the first notification includes a reminder or status update request for the first unit of work from the first user.

5. The system of claim 1, wherein the work unit records define the values of the work unit parameters for individual subunits of work that correspond to the individual units of work within the given set of units of work, such that the individual units of work of the first subset of units of work within the first set of units of work have corresponding first subunits of work that the first user is not assigned to but that the one or more of the other users are assigned to.

6. The system of claim 5, wherein the dashboard includes one or more drop down buttons such that responsive to the first user selecting a first drop down button corresponding to a first unit of work, the work information for the first subunits of work corresponding to the first unit of work is presented.

7. The system of claim 1, wherein the statuses of the first subset of units of work are indicated via colored status indicators within the dashboard.

8. The system of claim 1, wherein the one or more physical computer processors are further configured by the machine readable instructions to obtain the first set of units of work by determining the first subset of units of work that are associated with the first user are to be included in the first set of units of work based on the user records and the work unit records.

9. The system of claim 1, wherein the one or more physical computer processors are further configured by the machine readable instructions to:
monitor interactions of the first user with the first subset of units of work; and
determine one or more metrics characterizing the interactions of the first user with the first subset of units of work, the one or more metrics including one or more of a quantity of follow-ups, a follow-up frequency, a time period between follow-ups, follow-up timing, or which of the users receive follow-ups.

10. The system of claim 1, wherein the one or more physical computer processors are further configured by the machine readable instructions to:
obtain a second set of units of work where the first user is associated with second subset of units of work within the second set of units of work, wherein the first user is not assigned to the second subset of units of work but one or more of the other users are assigned to the second subset of units of work; and
effectuate presentation of a second dashboard displaying the work information for the second subset of units of work within the second set of units of work, wherein the work information for the second subset of units of work is based on the work unit records and indicates titles for the second subset of units of work within the second set of units of work, statuses of the second subset of units of work within the second set of units of work, and the user information for the one or more of the other users assigned to the second subset of units of work within the first set of units of work.

11. A method for providing a dashboard representing workflow for a collaboration work management platform, the method comprising:
managing environment state information for maintaining a collaboration environment, the environment state information including user records and work unit records, the environment state information defining a state of the collaboration environment including user states and work unit states, wherein the user states are defined by the user records that define values of user parameters associated with users interacting with and viewing the collaboration environment, and wherein the work unit states are defined by the work unit records that define values of work unit parameters for units of work managed within the collaboration environment, created within the collaboration environment, and assigned within the collaboration environment, the work unit records defining the values of the work unit parameters for individual units of work within sets of units of work, wherein an individual user is associated with the individual units of work within a given set of units of work such that the individual user has a higher level of responsibility for the individual units of work within the given set of units of work than other users that are assigned to the units of work and responsible for performing activities and actions for the units of work within the given set of units of work;
identifying a first user;
identifying a first set of units of work;
determining which of the units of work within the first set of units of work the first user is associated with but not assigned to by virtue of the first user having the higher level of responsibility, including determining the first user is associated with a first subset of units of work within the first set of units of work by virtue of the first user having the higher level of responsibility for the first subset of units of work, wherein the first user is not assigned to the first subset of units of work such that one or more of the other users are assigned to the first subset of units of work;
obtaining work information for the first subset of units of work within the first set of units of work, wherein the work information is based on the work unit records and indicates titles for the first subset of units of work within the first set of units of work, statuses of the first subset of units of work within the first set of units of work, and user information for the one or more of the other users assigned to the first subset of units of work within the first set of units of work; and
effectuating presentation of a dashboard displaying the work information for the first subset of units of work within the first set of units of work.

12. The method of claim 11, wherein the dashboard includes contact buttons corresponding to the individual units of work of the first subset of units of work.

13. The method of claim 12, further comprising:
generating, responsive to the first user selecting a first contact button corresponding to a first unit of work, a first notification for the first unit of work; and
transmitting the first notification to a second user assigned to the first unit of work.

14. The method of claim 13, wherein the first notification includes a reminder or status update request for the first unit of work from the first user.

15. The method of claim 11, wherein the work unit records define the values of the work unit parameters for individual subunits of work that correspond to the individual units of work within the given set of units of work, such that the individual units of work of the first subset of units of work within the first set of units of work have corresponding first subunits of work that the first user is not assigned to but that the one or more of the other users are assigned to.

16. The method of claim 15, wherein the dashboard includes one or more drop down buttons such that responsive to the first user selecting a first drop down button corresponding to a first unit of work, the work information for the first subunits of work corresponding to the first unit of work is presented.

17. The method of claim 11, wherein the statuses of the first subset of units of work are indicated via colored status indicators within the dashboard.

18. The method of claim 11, further including obtaining the first set of units of work by determining the first subset of units of work that are associated with the first user are to be included in the first set of units of work based on the user records and the work unit records.

19. The method of claim 11, further comprising:
monitoring interactions of the first user with the first subset of units of work; and
determining one or more metrics characterizing the interactions of the first user with the first subset of units of work, the one or more metrics including one or more of a quantity of follow-ups, a follow-up frequency, a time period between follow-ups, follow-up timing, or which of the users receive follow-ups.

20. The method of claim 11, further comprising:
obtaining a second set of units of work of units of work where the first user is associated with second subset of units of work within the second set of units of work, wherein the first user is not assigned to the second subset of units of work but one or more of the other users are assigned to the second subset of units of work; and
effectuating presentation of a second dashboard displaying the work information for the second subset of units of work within the second set of units of work, wherein the work information for the second subset of units of work is based on the work unit records and indicates titles for the second subset of units of work within the second set of units of work, statuses of the second subset of units of work within the second set of units of work, and user information for the one or more of the other users assigned to the second subset of units of work within the first set of units of work.

* * * * *